United States Patent
Kelly (10) Patent No.: US 8,479,239 B2
(45) Date of Patent: Jul. 2, 2013

(54) TECHNIQUE FOR DELIVERING THROUGH A COMMUNICATIONS NETWORK CONTENT OF ENTERTAINMENT PROGRAMS, AND VIDEO RECORDINGS PROVIDED BY USERS

(75) Inventor: Brian E. Kelly, Ridgefield, CT (US)

(73) Assignee: Time Warner Cable Enterprises LLC, New York, NY (US)

( * ) Notice: Subject to any disclaimer, the term of this patent is extended or adjusted under 35 U.S.C. 154(b) by 1080 days.

(21) Appl. No.: 10/936,294

(22) Filed: Sep. 8, 2004

(65) Prior Publication Data

US 2006/0053456 A1   Mar. 9, 2006

(51) Int. Cl.
*H04N 7/173* (2011.01)

(52) U.S. Cl.
USPC .............. 725/86; 725/87; 725/129; 725/146; 725/147

(58) Field of Classification Search
USPC ............................... 725/86, 87, 146, 147, 129
See application file for complete search history.

(56) References Cited

U.S. PATENT DOCUMENTS

| | | | |
|---|---|---|---|
| 5,956,716 A * | 9/1999 | Kenner et al. | 1/1 |
| 6,564,380 B1 * | 5/2003 | Murphy | 725/86 |
| 2003/0014750 A1 * | 1/2003 | Kamen | 725/25 |
| 2003/0040962 A1 * | 2/2003 | Lewis | 705/14 |
| 2003/0236836 A1 * | 12/2003 | Borthwick | 709/204 |
| 2004/0117837 A1 * | 6/2004 | Karaoguz et al. | 725/86 |
| 2005/0028206 A1 * | 2/2005 | Cameron et al. | 725/46 |
| 2005/0055721 A1 * | 3/2005 | Zigmond et al. | 725/78 |
| 2005/0120215 A1 * | 6/2005 | Lehew et al. | 713/171 |
| 2006/0026655 A1 * | 2/2006 | Perez | 725/91 |
| 2007/0157252 A1 * | 7/2007 | Perez | 725/61 |
| 2007/0168601 A1 * | 7/2007 | Plourde, Jr. | 711/112 |

\* cited by examiner

*Primary Examiner* — Jivka Rabovianski
(74) *Attorney, Agent, or Firm* — Otterstedt, Ellenbogen & Kammer, LLP

(57) ABSTRACT

A user may utilize a "home video on demand (HVOD)" service to distribute a video recorded using, e.g., a conventional camcorder, to desired viewers who have access to a broadband communications network, e.g., a cable TV network. The inventive system providing the HVOD service may receive from the user the video recording via email, postal mail, the Internet, computer transfer, etc. The inventive system converts the received video recording from its original video format to a uniform format, e.g., an MPEG-2 format. The converted video recording is stored in storage and made available to authorized viewers through the cable TV network.

7 Claims, 5 Drawing Sheets

WELCOME TO HVOD SERVICE

JOIN NOW:

☐ $9.99 PER MONTH FOR UNLIMITED NUMBER OF VIDEO TITLE SUBMISSIONS

☐ $3.00 PER VIDEO TITLE SUBMISSION

ALREADY A SERVICE MEMBER:

PLEASE LOG IN

USER ID  [JOHN245] ~ 407
PIN  [            ] ~ 409

FIG. 5

VIDEO QUESTIONAIRE

TITLE  [WEDDING] ~ 423
FORMAT [        ] ~ 425

AUTHORIZED END-USERS

1. ______________________
2. ______________________  } 427
   ⋮

430
☐ VIDEO UPLOAD

| VIDEO ID: 4610XXXX | | |
|---|---|---|
| NAME | POSTAL ADDRESS | IP (OR MAC) ADDRESS |
| END_USER1 | POSTAL_ADDRESS1 | STT_ADDRESS1 |
| END_USER2 | POSTAL_ADDRESS2 | STT_ADDRESS2 |
| ⋮ | ⋮ | ⋮ |
| END_USERN | POSTAL_ADDRESSN | STT_ADDRESSN |

321 { (rows)

HVOD SEARCH

605 — VIDEO ID  [4610XXXX]
607 — PASSWORD [        ]

FIG. 9

HVOD SEARCH

703 — USER ID [JOHN245]

711 — ITALY '98  ⎫
713 — WEDDING   ⎬ 709
        ⋮        ⎭

TECHNIQUE FOR DELIVERING THROUGH A COMMUNICATIONS NETWORK CONTENT OF ENTERTAINMENT PROGRAMS, AND VIDEO RECORDINGS PROVIDED BY USERS

FIELD OF THE INVENTION

The invention relates to communications systems and methods, and more particularly to a system and method for delivering information and entertainment programs through a communications network, e.g., a cable network.

BACKGROUND OF THE INVENTION

Video-on-demand (VOD) is popular nowadays and provided, e.g., by cable networks as such services as subscription VOD (SVOD), movies-on-demand (MOD), etc. Its popularity stems from the fact that it enables a user to select a desired program (e.g., movie, TV show, event, etc.) and time of his/her choice to view the program. To enhance the program enjoyment, the user is also allowed to manipulate a VOD presentation by performing such trick mode functions as rewinding, pausing, and fast-forwarding thereon.

With the advent of video camera technology, consumers nowadays can purchase inexpensive camcorders to make home movies, and videos for weddings, vacations, and any other events. Depending on the actual camcorder used, the video recording may be in an analog format, e.g., VHS, Hi8, etc. or in one of the various digital formats, e.g., DV, DVCPRO, DVCAM, Digital-S, Betacam SX, DVD, etc.

Photographs are alternatives to videos for commemorating notable events. Online photo services have been established whereby customers may send in rolls of film for development, and may be provided with the developed pictures online. To that end, an online photo service typically scans the developed pictures and stores the resulting pictures, which are in a digital format (e.g., JPEG), in the customer's personal archive on the photo service website. The customer may access the personal archive via web access. To share pictures stored in the archive, e.g., with friends and relatives, the customer needs to access the personal archive and selects the pictures to be shared. The customer may then utilize an email function on the website to send an email to the desired parties, which contains a link for accessing the selected pictures on the web.

SUMMARY OF THE INVENTION

The invention is premised upon the recognition that sharing a video recorded using a conventional camcorder with friends and relatives can sometimes be difficult and time-consuming. For one, the devices used by the friends and relatives to view the video may not be compatible with the format of the video recording. For example, a friend having a VHS VCR and DVD player cannot view a video recording if it is in a DV format. Thus, in prior art, in order to share the same video recording with friends and relatives, the video recording needs to be copied and may also need to be converted into different formats depending on what viewing devices the friends and relatives have, into which one needs to inquire. The resulting copies are then distributed to them, e.g., by mail. The copying, converting and mailing of the video recording to different individuals all take time, let alone the fact that one may not even have the proper equipment to convert the video recording from one format to another.

The invention is also premised upon the recognition that the Internet is not a particularly suitable network for distributing a video recording, e.g., to friends and relatives. Because a video recording typically contains a large volume of data, it takes a significant amount of time to transfer the data (especially if the receiving party has a relatively slow Internet access) during which the receiving party is prevented from performing other tasks on the Internet. In addition, the Internet is a public network, which actually is an international network of networks realized by cooperative efforts of a vast number of individual entities providing the network resources. That is, the Internet resources are not controlled by any single entity. As a result, no identifiable entities are responsible for overall Internet resource management, and security. In fact, the general perception is that data transported through the Internet, even over a "secure" link, is not completely secure, and is subject to interception and unauthorized copying at network nodes controlled by different entities. As such, the general public would not consider the Internet secure enough for private distribution of home videos, which most likely contain personal moments.

The invention takes advantage of the existing private, broadband network connectivity and VOD technology to provision a "home video on demand (HVOD)" service. For example, one such broadband network is a cable network which a cable operator(s) has been utilizing for decades to deliver TV, VOD and other programming content to selected subscribers on a conditional access basis. Its superior security is attributed to the fact that a cable network is under the administration of one or more identifiable cable operators from end to end, whose access is limited to certain customer premise equipment (e.g., set-top terminals), which is provided or approved by the cable operators. The inventive HVOD service allows a user to provide, e.g., on a cable system a video recording, made accessible to the desired parties (e.g., friends and relatives) connected to the system. Advantageously, the inventive service not only offers the viewing parties all of the desirable features of a VOD service, but also relieves the user of security concerns, and the burden of copying, converting and mailing a video recording for different viewing parties to share the same as in prior art.

In accordance with the invention, the HVOD service is provided over a broadband communications network (e.g., a cable network) delivering an entertainment service (e.g., cable TV, a VOD service, etc.). Content of a video recording received from a user of the HVOD service is served through the broadband communications network. Selected parties having access to the entertainment service are allowed to receive the content of the video recording over the communications network. Such selected parties are determined by the user. In accordance with a feature of the invention, the HVOD service also converts the received video recording from its original format to a uniform format, e.g., an MPEG-2 format, which is compatible with the traditional VOD service before its content is delivered through the communications network.

BRIEF DESCRIPTION OF THE DRAWING

Further objects, features and advantages of the invention will become apparent from the following detailed description taken in conjunction with the accompanying drawings showing illustrative embodiments of the invention, in which.

DETAILED DESCRIPTION

The invention is directed to providing a "home video on demand (HVOD)" service. By utilizing the inventive HVOD service, a user can provide on a communications system (e.g., a cable system) a video recording (e.g., recorded by a conventional camcorder), made accessible to the desired parties (e.g., friends and relatives) connected to the system. It will be appreciated that the inventive HVOD service may also be deployed in other communications systems, such as a direct broadcast satellite (DBS) system especially when its two-way communications capability is realizable. Advantageously, the HVOD service not only offers the viewing parties all of the desirable features of a VOD service, but also relieves a user of the burden of copying, converting and mailing the video recording for different viewing parties to share the same as in prior art.

In accordance with the invention, an HVOD service user can send a copy of a video recording (referred to as an "originating" user) to an operator of a communications system, e.g., a cable operator, by various means, e.g., postal mail, email, computer transfer, web upload, etc., along with other information concerning the video recording, e.g., its recording format, title of the video, etc. The originating user can limit access to the video recording to certain end-users, who may be subscribers to the cable TV service. The cable operator converts the received video recording from whatever well known video format to a uniform format compatible with the traditional VOD service (e.g., MPEG-2 format). The cable operator then makes available the converted video recording on one or more HVOD servers which, however, is accessible to only authorized end-users/viewers. In one embodiment, an end-user may be provided with a HVOD menu on a TV screen, listing video recordings, say, by title, to which the end-user has access. In this embodiment, the originating user when sending the video recording to the cable operator may specify the identities of the end-users authorized to view the same. The cable operator then creates and/or updates the HVOD menus associated with the authorized end-users to include the video recording in the listing.

In another embodiment, an end-user may search for a video recording on the system by its video ID, or alternatively a userID or other identifying information concerning the originating user who submitted the video recording. The end-user may also need to provide a password or meet other security requirements in order to open and view the video recording. For example, the video ID may be assigned by the cable operator for identifying the video recording. The userID may be assigned by the cable operator or selected by the originating user for identifying the originating user. The cable operator or originating user can communicate the video ID (or alternatively the userID and title of the recording if there is more than one title associated with the userID), along with a password, to the desired end-users, who may then access the video recording on the system based on such information.

Figure 1:
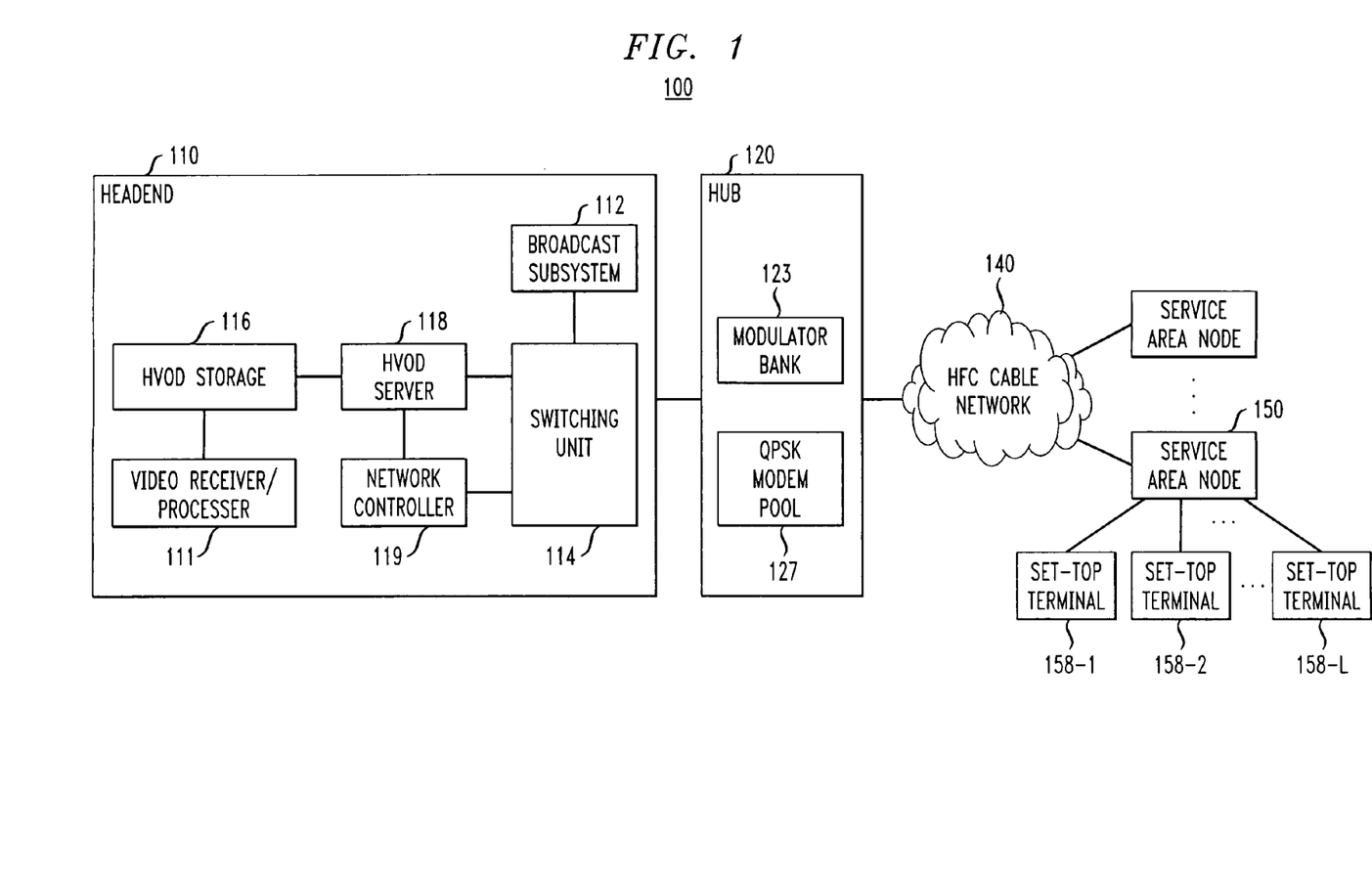
FIG. 1 is a block diagram of a broadband communications system in accordance with the invention.

FIG. 1 illustrates broadband communications system 100 embodying the principles of the invention for providing the HVOD service, and programming content to set-top terminals on users' premises. As shown in FIG. 1, system 100 includes headend 110, hub 120, hybrid fiber coaxial (HFC) cable network 140, and service area node 150 which is connected to set-top terminals 158-1 through 158-L in a neighborhood, where L is a predetermined number.

Broadcast subsystem 112 receives programming content from various providers and sources, e.g., analog and digital satellite sources, application servers, media servers, etc. In a conventional manner, the received composite program stream is processed by subsystem 112, resulting in transport streams. The resulting transport streams are switched by switching unit 114 to appropriate modulators in hub 120 to broadcast the programming content to users through HFC cable network 140.

To provide the HVOD service in accordance with the invention, video receiver/processor 111 is illustratively used which includes interfaces for receiving, from HVOD originating users, videos recorded thereby using, e.g., conventional camcorders. One such interface may provide web access to the video receiver/processor 111 at a predetermined uniform resource locator (URL) over the Internet. Such web access enables the originating user to upload his/her video recording to receiver/processor 111 through the Internet if he/she so desires. Another interface may comprise an email server capable of receiving, at a predetermined email address, email having a video recording attached thereto as an attached video file. The email server detaches the attached video file from one such email for processing. Yet another interface, alternative to the web and email interfaces, may enable a human operator to transfer the video recording, in tape or other storage form, received in the postal mail onto receiver/processor 111 for processing.

Receiver/processor 111 also includes conversion applications for converting the received video recordings from various original formats, e.g., VHS, Hi8, DV, DVCPRO, DVCAM, Digital-S, Betacam SX, DVD, etc., to a uniform format, e.g., an MPEG-2 format in this instance. The original format of a received video recording may be indicated by the originating user, determined by the human operator, or detected by processor/receiver 111 based on the header or filename extension of the video file.

Figure 2:
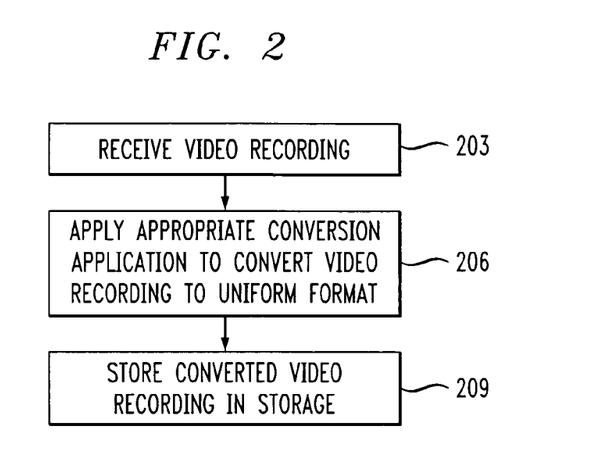
FIG. 2 is a flowchart depicting a process performed by an HVOD receiver/processor in the system of FIG. 1.

Thus, after receiver/processor 111 receives a video recording, as indicated at step 203 in FIG. 2, receiver/processor 111 at step 206 applies the appropriate conversion application to convert the video recording into the MPEG-2 format, compatible with the traditional VOD service. In accordance with the MPEG-2 format, the converted video recording may also include such metadata as the title of the video recording (e.g., provided by the originating user), a video ID assigned by receiver/processor 111, etc.

At step 209, receiver/processor 111 stores the converted video recording in storage 116. In one embodiment, the video recording is stored in association with the userID or other identifying information concerning the originating user. For example, such a userID may be assigned by the cable operator or selected by the originating user, as long as it is unique within system 100.

HVOD server 118 which includes such conventional VOD server functions as accessing HVOD storage 116 to provide a program stream containing a video recording in the MPEG-2 format for transmission to an end-user. In this instance, the program stream is transmitted through a transmission channel having a specified frequency band. It should be noted that the term "transmission channel", should not be confused with a "program channel." A "transmission channel" signifies a designated frequency band through which a program stream is transmitted. On the other hand, a "program channel" signifies the source of the program material selected by a user to view. For example, a user may select program channel 2 to view program material provided by CBS, program channel 14 to view program material provided by ESPN; program channel 32 to view program material provided by MTV, etc. In this illustrative embodiment, the transmission channels may be 6 MHz bands populating a forward passband, e.g., 350-750 MHz band, of a coaxial cable, which is allocated for downstream communication from headend 110 to a set-top terminal.

Modulator bank 123 in this instance is located in hub 120 connected to headend 105 via IP transport on the one hand and to HFC cable network 140 on the other hand. Bank 123 includes multiple modulators, each of which is used to modulate transport streams onto different carriers. Each modulated carrier carrying a transport stream containing multiple program streams is transmitted through a transmission channel associated therewith.

Figure 3:
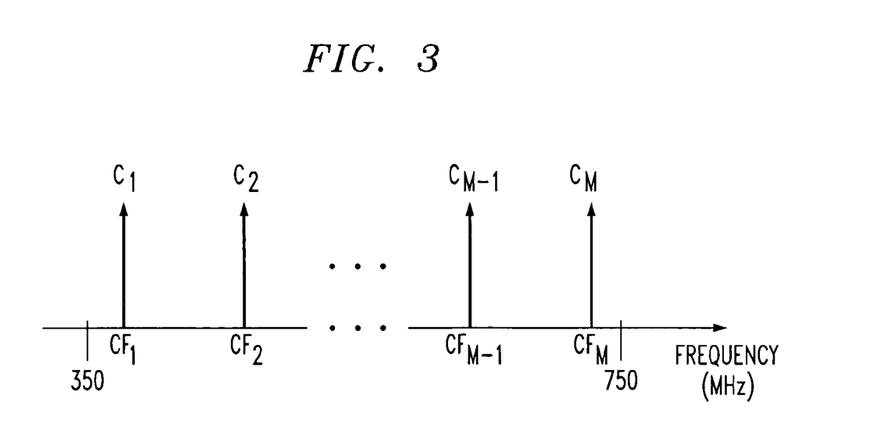
FIG. 3 illustrates selected carriers for transmitting an HVOD program stream in a forward passband of the system of FIG. 1.

FIG. 3 illustrates M carriers, $C_1$ through $C_M$, associated with M transmission channels in the forward passband. As shown in FIG. 3, the carrier frequency of $C_1$ is denoted $CF_1$; the carrier frequency of $C_2$ is denoted $CF_2$; ...; and the carrier frequency of $C_M$ is denoted $C_F$. In this example, each program stream may contain 4.2 Mb/s video and audio information. By using a 256-quadrature-amplitude-modulation (256-QAM) technique and 6 MHz transmission channel, each modulator in modulator bank 123 in this instance may modulate 9 or more program streams, multiplexed in a transport stream, onto the corresponding carrier. The resulting modulated carrier is transmitted through the transmission channel associated with the carrier.

Upstream data from a set-top terminal to headend 110 is communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. Downstream data from headend 110 to a set-top terminal is communicated via forward data channels (FDCs). These channels, often referred to as "out-of-band" channels, may occupy the 70-130 MHz band of a coaxial cable. For illustrative purposes, each FDC is allocated 1 MHz bandwidth here. It will be appreciated that a person skilled in the art may allocate other bandwidths therefor depending on the actual implementations.

A set-top terminal utilizes an RDC for sending, e.g., application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and network controller 125 are identified by the Internet protocol (IP) addresses assigned thereto. However, these IP addresses may be randomly assigned each time when system 100 is reconfigured. As a result, the IP address of a set-top terminal or controller 125 may change after a system reconfiguration. Nevertheless, each set-top terminal and controller 125 is also assigned a media access control (MAC) address on a permanent basis, surviving any system reconfiguration.

Figure 4:
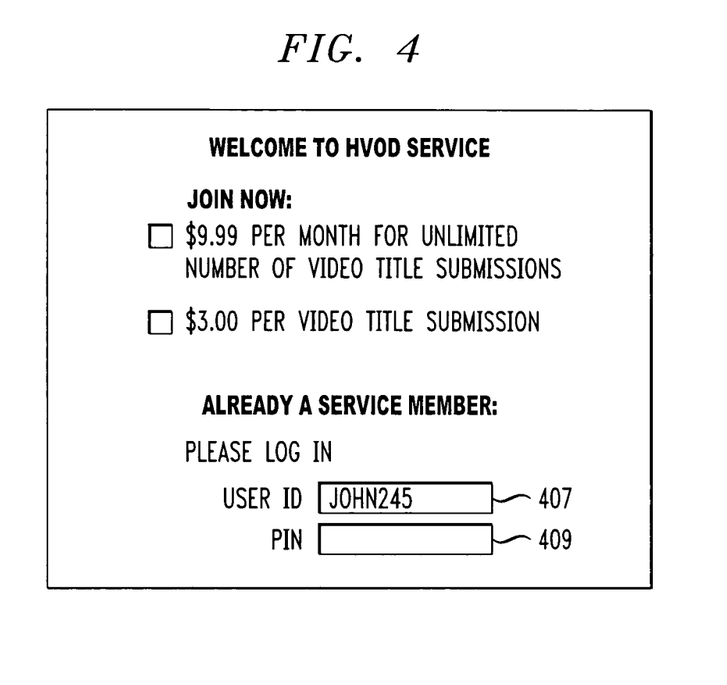
FIG. 4 illustrates a web page of an HVOD service in accordance with the invention.
Figure 5:
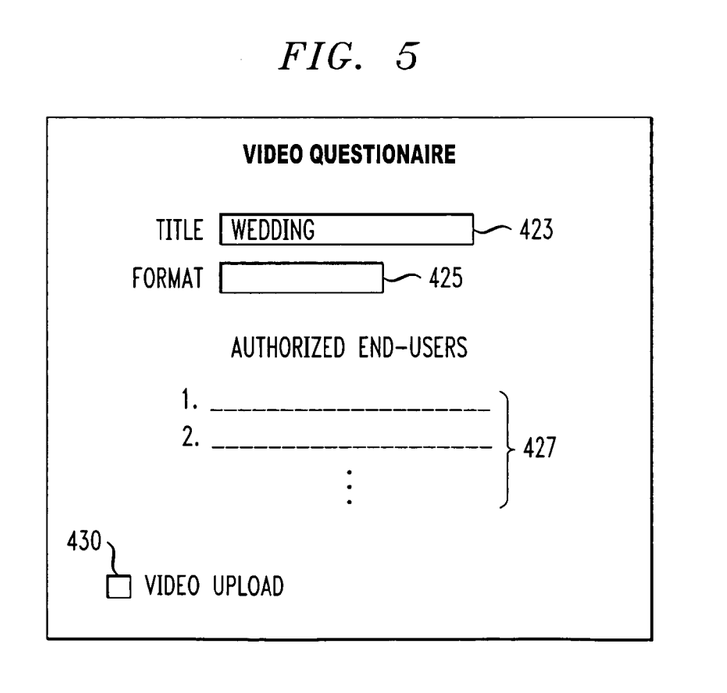
FIG. 5 illustrates a web page containing a video questionnaire for submitting a video recording to the HVOD service.

In a first illustrative embodiment of the invention, let's say an originating user, John, chooses to send a video recording to the cable operator through its HVOD website at the predetermined URL. FIG. 4 illustrates the home page of the HVOD website, where the originating user is encouraged to join the HVOD service. For example, for $9.99 per month, an originating user may utilize the HVOD service for submission of an unlimited number of video titles. Alternatively, an originating user may opt to pay $3.00 per video title submission. Assuming in this example that John already joined the HVOD service, as a service member, John may log in by entering his userID at entry 407, which is "John245" in this instance, and pre-established PIN at entry 409 for verification of his identity. Upon a successful login, John is prompted to fill out on a web page a video questionnaire concerning the video recording to be uploaded, which is illustrated in FIG. 5. For example, John is prompted to enter at entry 423 the title of the video recording (e.g., "Wedding"), which is given by the originating user, i.e., John in this instance. In addition, John may enter at entry 425 the video format which the video recording is in, especially if it is not apparent from the name extension of the file containing the recording to be uploaded. John is also required to provide at entries 427 the identities of the end-users authorized to view the video recording, who are subscribers to the cable TV service in this instance. Relying on a customer/billing database (not shown), the cable operator is able to identify the IP (or MAC) addresses of the set-top terminals associated with the authorized end-users/viewers of the Wedding video recording. After filling out the video questionnaire, John may select Video Upload option 430 to start uploading the file containing the video recording, e.g., via a secure link, to video receiver/processor 111 described above. It should be noted that in this instance John when joining the HVOD service went through a registration process where his/her name and contact information (e.g., telephone number, return postal address, email address, etc.) were placed on file with the HVOD service. Otherwise, an originating user when submitting a video recording may also need to provide to the cable operator his/her name and contact information for purposes of billing, returning any recording in physical storage, identifying the originating user to the end users of the recording, etc.

Figure 6:
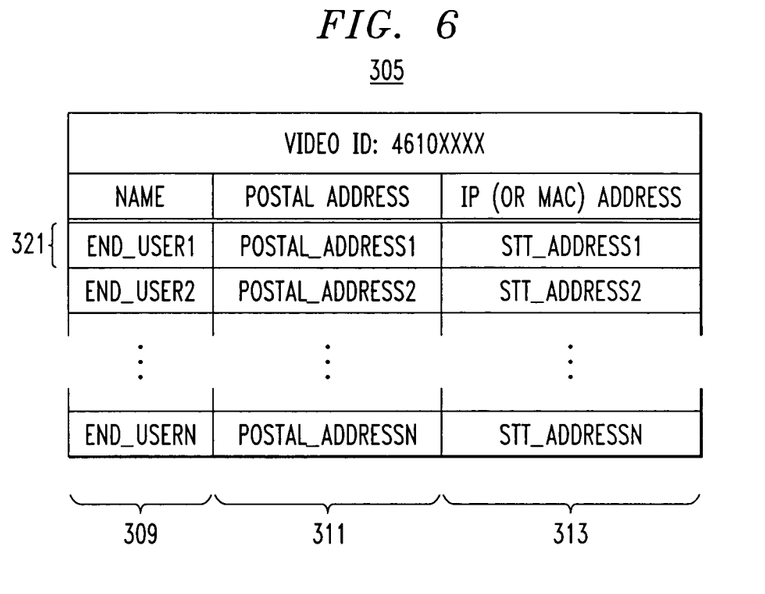
FIG. 6 illustrates a table listing network addresses of terminals of the authorized end-users of an HVOD video associated therewith.

FIG. 6 illustrates an authorized end-users table (denoted 305) generated by processor/receiver 111 resulting from a search of the billing/customer database based on the authorized end-user information provided by the originating user. As illustrated in FIG. 6, table 305 is associated with the Wedding video recording identified by the video ID (e.g., 4610xxxx) assigned by receiver/processor 111. Columns 309 and 311 contain identifying information concerning N authorized end-users/viewers of the Wedding video recording, e.g., their names and postal addresses, where N represents an integer. Column 313 contains the IP (or MAC) addresses of the set-top terminals associated with the authorized end-users. For example, entry 321 of table 305 indicates that the set-top terminal associated with the authorized END_USER1 at POSTAL_ADDRESS1 has an IP (or MAC) address STT_ADDRESS1.

For each IP (or MAC) address in column 313 of table 305, processor/receiver 111 determines whether an HVOD menu associated with the address has been created in storage 116. If so, processor/receiver 111 updates such a HVOD menu in storage 116 to include, e.g., the "Wedding from John" entry therein as an additional selectable option for viewing the Wedding video recording. Otherwise, processor/receiver 111 creates a new HVOD menu including therein the Wedding video recording viewing option, and stores it in storage 116 in association with the IP (or MAC) address in question.

By way of example, network controller 119 in headend 110 in this instance receives a request for the HVOD service from a set-top terminal having STT_ADDRESS1, say, set-top terminal 158-1. Such a request may be initiated by an end-user in various ways. For example, the request may be initiated when a user accesses a pre-designated program channel (e.g., program channel 3) that is dedicated to providing the HVOD service. In another instance, the request may be initiated when a user presses one or more keys on a remote control associated with the set-top terminal to select a displayed HVOD option. In either instance, terminal 158-1 formats the request and transmits the resulting request, including the IP (or MAC) address of terminal 158-1 (i.e., STT_ADDRESS1 in this instance), to headend 110 through an RDC.

Upon receiving the request for the HVOD service, network controller 119 in a conventional manner identifies a carrier, say $C_1$, for carrying a transport stream destined for the neighborhood of terminal 158-1. It should be noted that each carrier in system 100 is associated with a different one of the transmission channels in the forward passband. In addition, each transport stream is identified by a different transport stream identification (TSID) in system 100. Controller 119 causes HVOD server 118 to access HVOD storage 116 for the HVOD menu associated with STT_ADDRESS1, and generate a program stream containing the HVOD menu. Such a program stream, identifiable by a program ID (PID), may be multiplexed with other program streams in the transport stream. Server 118 causes switching unit 114 to switch the transport stream to an appropriate modulator in modulator bank 123 where the transport stream is modulated onto the identified carrier, i.e., $C_1$ in this instance. The modulated carrier traverses the transmission channel associated therewith in HFC cable network 140.

In response to the received request, network controller 119 communicates to terminal 158-1 via an FDC a message concerning the carrier frequency to which terminal 158-1 should tune to receive the appropriate transport stream, and the PID for extracting the desired program stream identified thereby from the transport stream. Accordingly, relying on the information in such a message, terminal 158-1 obtains the desired program stream. In a well known manner, terminal 158-1 converts the program stream to appropriate signals for the associated TV to display the HVOD content, including an HVOD MENU GUI.

Figure 7:
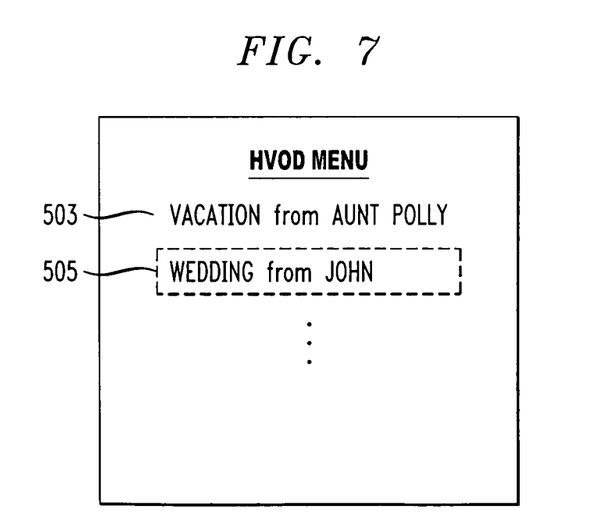
FIG. 7 illustrates an HVOD menu listing video options made available to an authorized end-user, in accordance with a first embodiment of the invention.

FIG. 5 illustrates one such HVOD MENU GUI, listing video recordings which are available for END_USER1 to view. As shown in FIG. 7, the HVOD MENU GUI in this instance includes such video options for selection as Vacation From Aunt Polly option 503, Wedding From John option 505, etc. These video options are also represented by their respective video IDs also transmitted to terminal 158-1 as part of the HVOD Menu. The user may use navigation keys (e.g., up and down navigation keys) on the remote control associated with terminal 158-1 to access and highlight one of the options before it is selected. In this instance, the user highlights and selects Wedding From John option 505. The selection may be accomplished by pressing a "Select" key on the user's remote control. Accordingly, terminal 158-1 sends a HVOD request including the video selection represented by its video ID, i.e., 4610xxxx in this instance, and the terminal IP (or MAC) address, i.e., STT_ADDRESS1 in this instance, to HVOD server 118. In response, server 118 retrieves from storage 116 the Wedding video recording identified by the received video ID, and places the retrieved video content, which is in the MPEG-2 format, in the program stream already assigned for transmission to STT_ADDRESS1.

Figure 8:
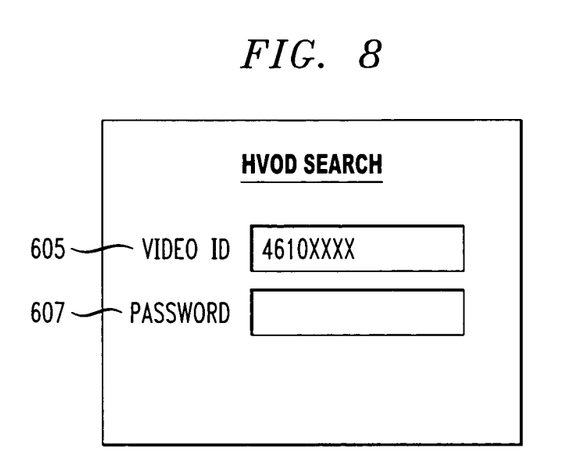
FIG. 8 illustrates a HVOD Search graphical user interface (GUI) for accessing a particular HVOD video, in accordance with a second embodiment of the invention.

In a second illustrative embodiment, an end-user may be provided with a HVOD Search GUI, instead of the HVOD MENU GUI, when the end-user invokes the HVOD service. FIG. 8 illustrates one such HVOD Search GUI, whereon the end-user may enter, e.g., using a remote control, in entry 605 the video ID of the video recording which he/she wants to access. In addition, to verify that he/she is an authorized end-user of such a video recording, the end-user in this instance is required to enter the password in entry 607, or meet other security requirements, associated with the video recording. In this example, the video ID of the video recording is assigned by the cable operator while the password is provided by the originating user when initially submitting the video recording to the cable operator. In one instance, the cable operator informs the originating user of the assigned video ID of the submitted video recording, and the originating user then communicates such a video ID, along with the password associated with the submitted video recording, to the desired end-users. In another instance, the cable operator directly communicates such video ID and password to the end-users designated by the originating user, e.g., via email, postal mail, telephone, pager, instant messaging, etc., especially when the end-users are also subscribers to the cable TV service whose contact information is maintained by the cable operator. It should be noted that, in this illustrative embodiment, unlike the previous embodiment, an end-user does not need to view an HVOD video at an authorized subscriber's terminal. Rather, as long as the end-user has access to the cable TV service, e.g., in a hotel, and is able to provide the video ID of the video recording and the associated password on the HVOD Search GUI, the end-user is allowed to access and view such a video recording.

Figure 9:
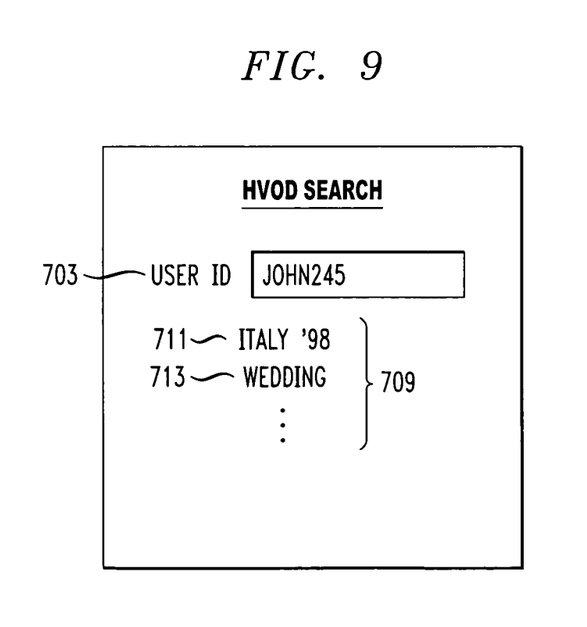
FIG. 9 illustrates an alternative HVOD Search GUI, in accordance with a third embodiment of the invention.

An alternative HVOD Search GUI is illustrated in FIG. 9. In this alternative embodiment, the video recordings submitted by an originating user are stored in storage 116 in association with the userID (or other identifiers) of the originating user. If an end-user wants to access one of the video recordings submitted by an originating user, the viewer needs to enter in entry 703 the userID of the originating user on the GUI. Such a userID may be assigned by the cable operator or selected by the originating user, as long as it is unique in system 100. As shown in FIG. 9, after the end-user enters the userID (e.g., "John245") of a particular originating user, say, John, a listing of video recording options (denoted 709) previously submitted by John is displayed. For example, listing 709 in this instance includes Italy '98 option 711, Wedding option 713, etc. A selection of one such option, say, option 713, may be followed by prompting the end-user to enter a password (or meet other security requirements) to access the corresponding Wedding video recording. Such a password may be provided by John to the HVOD service when he initially submits the Wedding video recording to the service. It should be noted that John may employ the same or a different password for access to each of the video recordings in listing 709. If the same password is used for each video recording, John may need to specify it once to the HVOD service. Again, in this alternative embodiment, an end-user does not need to view an HVOD video at an authorized subscriber's terminal. As long as the end-user has access to the cable TV service, and is able to provide the user ID of an originating user and the password associated with the desired video recording submitted by the originating user, the end-user is allowed to access and view such a video recording.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, HVOD server 118 is illustratively located in headend 110. However, HVOD servers may also be distributed, e.g., among hubs (120). An end-user may be provided with the HVOD service by a HVOD server in the hub closest to the end-user. One such distributed VOD server configuration and network architecture are described, e.g., in International Publication Number WO 02/03249 published on Jan. 10, 2002, incorporated herein by reference.

In addition, it will be appreciated that the HVOD service in accordance with the invention can be provisioned across cable TV networks operated by different cable operators, thereby transcending the traditional service boundaries set by the cable operators. In that case, end-users can access an HVOD video not only through the cable TV service which initially received the video recording from an originating user, but also other cable TV services.

Finally, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method comprising the steps of:
    receiving, by a video-on-demand network, a home video from an originating user of a video service offered over said video-on-demand network;
    storing a content of said home video of said originating user in a first node of said video-on-demand network;
    obtaining, from said originating user, an identity of at least one subscriber of said video-on-demand network who is authorized to view said content of said home video of said originating user over said video-on-demand network, said at least one subscriber being other than said originating user;
    adding said at least one subscriber to an authorized end users table;
    modifying a menu of said at least one subscriber to make said content of said home video of said originating user available on said menu, wherein said menu of said at least one subscriber is modified to make said content of said home video from said originating user available based on said at least one subscriber being added to said authorized end users table; and
    responsive to a menu selection from said menu, providing said content of said home video of said originating user to said at least one subscriber, said at least one subscriber receiving said content of said home video of said originating user in a program stream transmitted through a transmission channel having a specified frequency band over said video-on-demand network at a second node of said video-on-demand network, said second node being different than said first node.

2. The method of claim 1, wherein, in said receiving step, said home video is received in an original video format, further comprising converting, in said video-on-demand network, said home video from said original video format to a selected video format suitable for transportation of said content of said home video through said video-on-demand network.

3. The method of claim 2, wherein, in said providing step, said video-on-demand network comprises a cable television network.

4. The method of claim 3, wherein:
    said first node comprises a head end of said video-on-demand network; and
    in said providing step, said at least one subscriber receives said content of said home video from said head end at said second node, said second node comprising a set top terminal in a home of said at least one subscriber.

5. The method of claim 4, wherein, in said modifying step, said menu is stored in said head end.

6. The method of claim 3, wherein:
    said first node comprises a hub of said video-on-demand network; and
    in said providing step, said at least one subscriber receives said content of said home video from said hub at said second node, said second node comprising a set top terminal in a home of said at least one subscriber.

7. The method of claim 6, wherein, in said modifying step, said menu is stored in said hub.

\* \* \* \* \*

UNITED STATES PATENT AND TRADEMARK OFFICE
CERTIFICATE OF CORRECTION

| | | |
|---|---|---|
| PATENT NO. | : 8,479,239 B2 | Page 1 of 1 |
| APPLICATION NO. | : 10/936294 | |
| DATED | : July 2, 2013 | |
| INVENTOR(S) | : Kelly | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this
Twenty-fourth Day of February, 2015

Michelle K. Lee
*Deputy Director of the United States Patent and Trademark Office*